Dec. 24, 1940.   R. J. OLANDER   2,225,711
CAR CONSTRUCTION
Filed Aug. 31, 1939   2 Sheets-Sheet 1
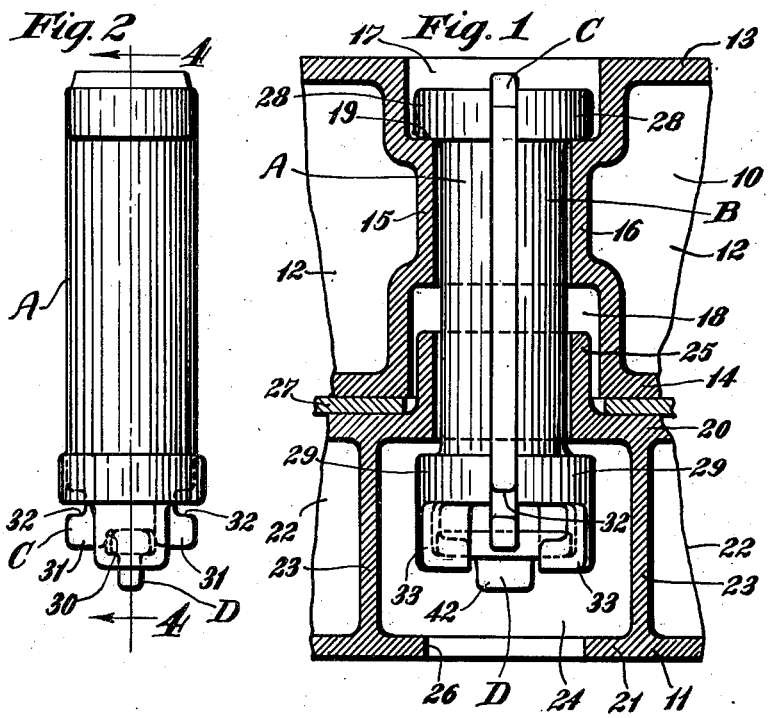
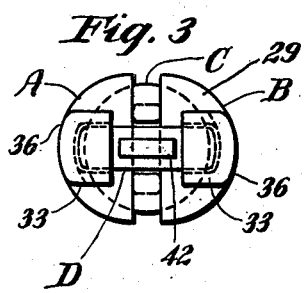
Inventor
Roland J. Olander
By Henry Fuchs
Atty.

Dec. 24, 1940. R. J. OLANDER 2,225,711
CAR CONSTRUCTION
Filed Aug. 31, 1939 2 Sheets-Sheet 2
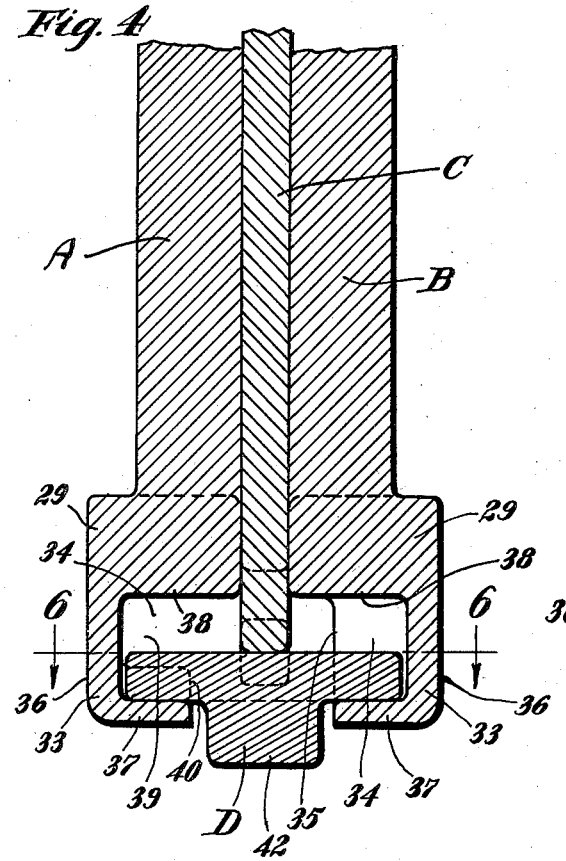
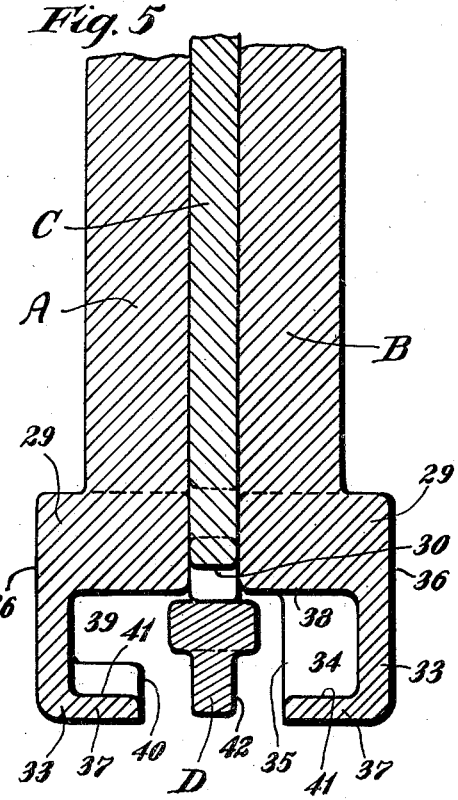
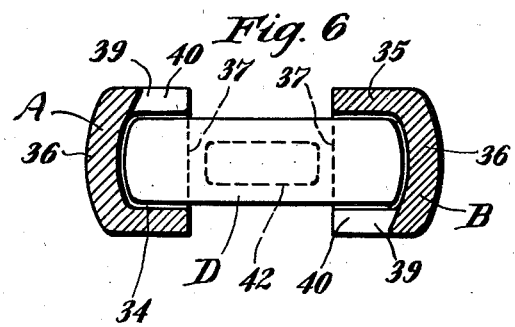
Inventor
Roland J. Olander
By Henry Fuchs.
Atty Patented Dec. 24, 1940

2,225,711

UNITED STATES PATENT OFFICE 2,225,711

CAR CONSTRUCTION

Roland J. Olander, Chicago, Ill., assignor to W. H. Miner, Inc., Chicago, Ill., a corporation of Delaware Application August 31, 1939, Serial No. 292,803

7 Claims. (Cl. 105—200)

This invention relates to improvements in car construction.

In the operation of railroads, experience has demonstrated that it is highly advisable to so connect the body and truck bolsters of the car that they cannot separate vertically in the event of collision or derailment, since this effectively prevents or minimizes turning over or telescoping of cars. Locking pins are now extensively used to thus connect the bolsters, however, in the case of certain types of car construction it is impossible to insert these locking pins from the top of the underframing and the pin must therefore be inserted and locked from the underneath side of the truck bolster.

The main object of the invention is to provide an improved car construction, particularly for cars wherein the pin must be applied from underneath the truck bolster, wherein the pin may be readily inserted and locked from underneath the truck bolster while the car body including the body bolster is assembled with the complete truck, and also easily unlocked and removed when desired.

A more specific object of the invention is to provide a locking pin of the character set forth in the preceding paragraph, comprising a pair of outer sections headed at opposite ends and a central spreader plate for holding the sections apart and the headed ends thereof in shouldered engagement with the bolsters of the car, wherein simple and efficient means, which may be readily applied and detached, is provided for locking the spreader plate against removal.

Other objects of the invention will more clearly appear from the description and claims hereinafter following.

In the drawings forming a part of this specification, Figure 1 is a vertical sectional view taken lengthwise of the car through the mid-portions of the body and truck bolsters of the underframe structure, illustrating my improved center pin in connection therewith, said pin being shown in elevation. Figure 2 is a side elevational view of the pin illustrated in Figure 1 looking from right to left in said figure. Figure 3 is a bottom end view of the pin only, illustrated in Figure 1. Figure 4 is a vertical sectional view, partly broken away, and on an enlarged scale, of the lower end portion of the pin illustrated in Figure 2, the section being on the line 4—4 of Figure 2. Figure 5 is a view similar to Figure 4, but showing the parts in different position. Figure 6 is a horizontal sectional view, corresponding substantially to the line 6—6 of Figure 4, the central spreader or filler plate being omitted in this view.

In said drawings, 10 indicates the body bolster of the car and 11 the truck bolster. The body bolster 10 is of the cast type and has diaphragm sections 12—12, top and bottom walls 13 and 14, and a center section 15 to accommodate the center pin. The section 15 is of cylindrical, tubular form, as shown, and of reduced diameter between the top and bottom ends, as indicated at 16, thereby providing a pocket 17 at the top and a pocket 18 at the bottom of the bolster 10. The bottom of the pocket 17, where it merges with the section 16, provides an annular shoulder 19.

The truck bolster 11, which is also preferably a casting, has top and bottom walls 20 and 21 connected by side webs 22—22 and spaced, transverse, vertical walls 23—23 connecting the top and bottom walls 20 and 21 and the webs 22—22. The spaced walls 23—23 define a pocket 24 therebetween which serves to accommodate the bottom head of the center pin connecting the bolsters. The top wall of the truck bolster is provided with an upstanding hollow boss in the form of an annular flange 25 which projects into and is accommodated within the bottom pocket 18 of the body bolster 10. The opening defined by the flange 25 is in axial alignment with, and corresponds in diameter to, the opening provided by the contracted portion 16 of the tubular section 15 of the bolster 10. The bottom wall of the bolster 11 at the pocket 24 is provided with an opening 26 which is axially aligned with the opening defined by the flange 25, but of somewhat greater diameter than said last named opening. The usual bearing plate or shim 27 is interposed between the body and truck bolsters.

The body bolster is interlocked with the truck bolster by the improved locking pin which comprises broadly a pair of outer sections A and B, a central spreader plate C, and a locking plate or key member D.

The two outer sections A and B are of the same design, but reversely arranged, as hereinafter pointed out. Each outer section is of substantially semi-cylindrical cross section and is provided, at the top thereof, with an eccentric, substantially semi-cylindrical, outstanding flange 28, and with a concentric, substantially semi-cylindrical, outstanding, relatively heavy flange 29 at the bottom thereof.

The spreader plate C is in the form of an elongated, relatively thick, flat bar interposed between the sections A and B to form the complete pin and hold the outer sections spread apart with the flanges 28 and 29 thereof in shouldered engagement with the body and truck bolsters.

As will be seen upon reference to Figure 1, when the pin comprising the outer sections A and B and the spreader plate C interposed between said sections, is applied to the bolsters, the shank of the pin substantially fits the opening of the contracted portion 16 of the section 15 of the body bolster 10 and the opening defined by the upstanding, annular flange or boss 25 of the truck bolster 11, and the flanges 28—28 and 29—29 at the top and bottom ends of the outer sections A and B form enlarged top and bottom head portions, respectively, which hold the pin against removal from the bolsters. As will be seen upon reference to Figure 1, the flanges 28—28 at the top ends of the sections A and B overlap the annular shoulder 19 of the pocket 17 of the body bolster, thereby preventing removal of the pin in a downward direction. The flanges 29—29 at the bottom ends of these sections A and B resist upward movement of the pin by engagement with the shoulder presented by the top wall of the pocket 24 of the bolster 11.

The eccentric flanges 28—28 at the top ends of the sections A and B are of such a size that they will freely pass through the pin receiving openings of both the body and truck bolsters when the plate C is not present, that is, the effective diameter of the top head of each pin formed by the flanges 28—28 is reduced to such a size when the plate C is not present that said flanges pass freely upwardly through the pin receiving openings of the bolsters as the sections are inserted one at a time from underneath the truck bolster, and also pass freely downwardly through said openings when the pin is withdrawn.

The spreader plate C is of the same width as the flat inner side faces of the semi-cylindrical sections A and B of the center pin and is of such a length that it projects slightly above and below the top and bottom ends of the pin proper, as defined by said top and bottom flanges 28—28 and 29—29. The projection of the plate C at the top of the pin is less than at the bottom end thereof, and, as shown in Figure 2, the corners of the upper end of the plate are beveled off to facilitate insertion of the same between the outer sections of the pin while the parts are being applied to the bolsters. The bottom end of the plate C is centrally notched or recessed, as indicated at 30, thereby providing depending lugs 31—31 at opposite sides of said plate. Near the bottom end portion thereof, the plate is also notched at opposite side edges, as indicated at 32—32. These notches 32—32 serve to facilitate removal of the plate by means of a hook or similar implement.

Each of the sections A and B has the bottom flange thereof provided with a depending lug 33. The lugs 33—33 of the two sections A and B are diametrically opposite when the pin is assembled, as clearly shown in Figures 1, 3, 4, 5, and 6. These lugs are spaced apart, as shown, and each lug is cut out on the inner side to provide a recess 34. The recess 34 of the lug 33 of each section A and B is defined by a vertical side wall 35, an arcuate or curved outer wall 36, a bottom wall 37, and a top wall 38. The top wall 38 is a continuation of the bottom surface of the flange 29 and the bottom wall 37 is, in effect, a supporting shelf for the locking block D, as hereinafter will appear. At the side opposite the wall 35, the pocket is open, as indicated at 39, and the bottom wall 37 at the corresponding edge thereof is provided with an upstanding rib or flange 40 which is parallel to the wall 35. A seat 41 is thus provided between the wall 35 and the flange 40. The two sections A and B of the pin, when assembled, have the pockets thereof reversed in direction, that is, the open sides 39—39 thereof at the opposite sides of the pin.

The locking block or key member D is in the form of a relatively short bar having a depending, centrally disposed, substantially rectangular wing portion 42 by which it may be manipulated. The opposite ends of the block D are rounded off to correspond with the curvature of the inner surfaces of the walls 36—36 of the lugs 33—33, and the block is of such a length that it is freely accommodated between said walls. The width of this block is such that its opposed ends may be seated in the seats 41—41 of the lugs 33—33 when the block is in the position shown in Figures 1, 2, 3, 4, and 6, and its thickness is such that when it is disposed in horizontal position it may freely pass through the openings 39—39 of the pockets of said lugs 33—33. When the parts of the pin are in assembled position on the bolsters of the car, the spreader plate C is supported on the key or block D with the lugs 31—31 of said plate straddling the block, as most clearly shown in Figures 2, 3, and 4, and the block in turn is seated in the seats 41—41 of the lugs 33—33 and supported by said lugs. The key or block is thus effectively locked against accidental removal, the same being held in the seats 41—41 by the weight of the plate C and thus locked by the seats against accidental rotation and removal.

In applying the center pin to the bolsters, the sections A and B are first inserted in the pin receiving openings by passing the same, one at a time, upwardly through said bolsters, the top flanges clearing the walls of the openings due to the contracted state of the head formed by said flanges, as hereinbefore pointed out. After the top flange of each section has been brought to a position above the level of the shoulder 19 of the pocket 17, and moved laterally, bringing the top flanges 28—28 and the bottom flanges 29—29 into overhanging relation respectively with the shoulder 19 of the body bolster and the shoulder formed by the top wall of the pocket 24 of the truck bolster, the spreader plate C is inserted upwardly between the sections A and B, thus keeping the latter apart.

The locking key or block D is applied by inserting the same upwardly between the lugs 33—33 of the sections A and B of the pin while the block is held in the position shown in Figure 5, that is, in a position rotated through an angle of 90° from the position shown in Figures 1, 2, 3, 4, and 6. The length of the block is thus disposed in a direction parallel to the width of the spreader plate C. The block is raised approximately to the height shown in Figure 5 with the spreader plate C resting thereon. In this position the body portion of the block is above the top edges of the flanges 40—40 of the seats of the lugs 33—33 of the sections A and B of the pin so that when the block is rotated toward the position shown in Figure 6, it will pass freely through the side openings 39—39 of the lugs. The block is then brought to the locking position by rotating the same through an angle of 90°, to the position shown in Figures 1, 2, 3, 4, and 6 and dropping the same into the seats 41—41. While this operation is being preformed, the spreader plate C may gravitate to the position where it rests on the key or block D with the lugs 31—31 embracing the key. In the event that the plate C should fail to gravitate to this position, it may be forced or pulled downwardly by a hook or other tool engaged with the notches 32—32 or either of them.

In removing the pin, the operation is substantially the reverse of that just described, the key being removed by first lifting the same upwardly until completely disengaged from the seats 41—41, lifting the spreader plate C until the lugs 31—31 clear the top side of the key, then rotating the key through 90° to the position shown in Figure 5, when it is completely disengaged from the lugs 33—33, and then withdrawing the same downwardly from between the lugs 33—33, thus removing it completely from the pin. The spreader plate C may then be readily withdrawn from between the sections A and B, permitting the latter to be collapsed and also withdrawn from the center pin openings of the bolsters.

I have herein shown and described what I now consider the preferred manner of carrying out my invention, but the same is merely illustrative and I contemplate all changes and modifications that come within the scope of the claims appended hereto.

I claim:

1. In car construction, the combination with body and truck bolsters having aligned center pin receiving openings; of a center pin insertable from beneath said truck bolster, said pin including outer members headed at opposite ends and a central filler member between said outer members, said filler member holding the heads of the outer members in shouldered engagement with the bolster; a locking element supporting said filler member against removal; and spaced supporting shoulders for said element on said outer members, said element being insertable between said spaced shoulders in a direction lengthwise of the pin and movable in another direction engaging the same over said shoulders.

2. In car construction, the combination with body and truck bolsters having aligned center pin receiving openings; of a center pin insertable from beneath said truck bolster, said pin including outer members headed at opposite ends and a central filler member between said outer members, said filler member holding the pin expanded with said heads in shouldered engagement with the bolsters; spaced depending retaining lugs on the lower ends of the outer members, said lugs being provided with horizontal ledges extending toward each other and spaced apart at their inner ends; and a locking element insertable between said lugs and ledges thereof in one position of said element, said element being rotatable about a vertical axis to another position to overhang and rest on said lugs, said locking element supporting the filler member.

3. In car construction, the combination with body and truck bolsters having aligned center pin receiving openings; of a multipart center pin including outer members and a filler member between said outer members, said outer members being headed at opposite ends and having shouldered engagement with the bolsters, said outer members being insertable into said openings from beneath the truck bolster, and said filler member being insertable from beneath the truck bolster between said outer members to spread the latter apart and hold the heads thereof in shouldered engagement with the bolsters; a locking element supporting said filler member against removal in downward direction; and laterally spaced retaining means on said outer members for holding said locking element against removal in downward direction, between which said element is upwardly insertable from beneath said pin, said locking element being displaceable in a horizontal direction to engage said retaining means, said filler member being notched at its lower end to embrace said locking element from opposite sides and hold the latter against lateral displacement.

4. In a locking pin of the character described, the combination with elongated outer sections having retaining flanges at the top and bottom ends thereof; of a filler plate between said outer sections; horizontal key supporting ledges at the bottom ends of said outer sections, said ledges projecting toward each other and having their adjacent ends spaced apart; and an elongated key resting on said ledges and supporting said filler plate, said ledges being spaced apart a distance greater than the width of the key to permit passage of said key therebetween inwardly from the bottom end of said pin when rotated to a position in lengthwise alignment with the opening between said adjacent ends of said ledges, said spacing between the ledges being less than the length of the key.

5. In a locking pin of the character described, the combination with a pair of elongated outer sections having retaining flanges at the top and bottom ends; of an elongated filler plate section between said outer sections; opposed key supporting pockets on said outer sections at the bottom ends thereof, said pockets having openings facing each other, said pockets also having each a side opening, said side openings being at opposite sides thereof; and an elongated key for supporting said filler plate section, said key being of a width to pass between said pockets, of a thickness to pass through said side openings, and of a length greater than the spacing between said opposed pockets.

6. In a locking pin of the character described, the combination with a pair of outer members headed at the top and bottom ends; of a filler plate between said members for holding the same separated; a supporting ledge on each outer member underlying the head thereof at the bottom end, said ledges of said outer members projecting toward each other and being spaced apart; and a key member of a width to pass between said ledges, of a length greater than the spacing between said ledges, and of a thickness to pass freely between the bottom faces of the bottom heads of said outer members and said ledges.

7. In a locking pin of the character described, the combination with a pair of outer members headed at the top and bottom ends; of a filler plate between said members for holding the same separated; opposed supporting lugs depending from the bottom ends of said outer members, said lugs having inturned supporting arms at their lower ends presenting supporting ledges, the space between said ledge of each lug and the bottom face of the corresponding outer member at at least one side of said lug being unobstructed; and a retaining element adapted to pass laterally through said unobstructed space and normally supported on said ledges and supporting the bottom end of said filler plate, said ledges having seats in which the retaining element is engaged and held against sidewise displacement, said retaining element being held in said seats by the weight of said filler plate.

ROLAND J. OLANDER.